United States Patent [19]

Cronin-Golomb et al.

[11] Patent Number: 4,979,828
[45] Date of Patent: Dec. 25, 1990

[54] PHASE CONJUGATE INTERFEROMETER FOR MEASURING THIN FILM PROPERTIES

[75] Inventors: Mark Cronin-Golomb, Reading, Mass.; Joseph Shamir, Haifa, Israel

[73] Assignee: Tufts University, Medford, Mass.

[21] Appl. No.: 435,260

[22] Filed: Nov. 13, 1989

[51] Int. Cl.$^5$ .............................................. G01B 9/02
[52] U.S. Cl. .................................................. 356/361
[58] Field of Search ........................ 356/361, 355, 357

[56] References Cited

U.S. PATENT DOCUMENTS

| | | | |
|---|---|---|---|
| 4,280,764 | 7/1981 | Sica, Jr. et al. | 356/35.5 |
| 4,529,273 | 7/1985 | Cronin-Golomb et al. | 350/354 |
| 4,718,749 | 1/1988 | Chiou et al. | 350/163 |
| 4,773,719 | 9/1988 | Anderson et al. | |
| 4,832,463 | 5/1989 | Goldner et al. | |

OTHER PUBLICATIONS

"Optical parameters of partially transmitting thin films", by J. Shamir & P. Graff, Applied Optics, vol. 14, No. 12, Dec. 1975.

Primary Examiner—Samuel Turner

[57] ABSTRACT

An interferometric device for measuring optical thin film parameters such as refractive index, thickness and absorption uses phase conjugate mirrors in place of standard mirrors. The optical thin film for which the refractive index, thickness and absorption are determined acts as a beam-splitter in the interferometer.

11 Claims, 3 Drawing Sheets

PHASE CONJUGATE INTERFEROMETER FOR MEASURING THIN FILM PROPERTIES

BACKGROUND OF THE INVENTION

Thin films are vital to the operation of many integrated optic and optoelectronic devices. Thin film ion-conductive coatings are currently employed within electrochromic devices and solid state storage batteries as described, for example, in U.S. Pat. No. 4,832,463. These devices basically consist of a number of transparent optical films deposited on a transparent substrate such that the properties of the optical films such as thickness, index of refraction and absorption must be carefully controlled. One method for determining such optical properties is to employ the optical film sample as one beam-splitter within an optical interferometer as described in the paper entitled "Optical Parameters of Partially Transmitting Thin Films" by J. Shamir and P. Graff, published in the *Applied Optics*, December 1985, Volume 14, No. 12. The use of the optical film sample as one of the beam-splitters, however, requires manual beam alignment procedures that are difficult to achieve. Since the accuracy of the measurements strongly depends on the uniformity of the interference patterns developed, non-uniformity of the optical film sample or of the other optical components could lead to ambiguous results. Phase conjugate mirrors as one means of correcting phase distortions in an optical laser cavity is described within U.S. Pat. No. 4,529,273. The use of phase conjugate mirrors within other such optical devices is described within U.S. Pat. No. 4,280,764; 4,718,749 and 4,773,719. When the electrochromic devices described in the aforementioned U.S. Patents are considered for commercial utilization, such precision manual alignment would render interferometric evaluation extremely difficult and economically infeasible. One object of the instant invention is to provide apparatus which automatically provides beam alignment while compensating for any non-uniformity of both the optical films and the accompanying optical components.

SUMMARY OF THE INVENTION

The invention comprises an optical film interferometric measuring device in which the optical film to be measured is employed as one of the beam-splitters. The use of phase conjugate mirrors within the interferometer automatically aligns the transmitted and reflected light beams while compensating for any non-uniformity within the optical components or the optical film, per se.

DESCRIPTION OF THE PREFERRED EMBODIMENT

Figure 1:
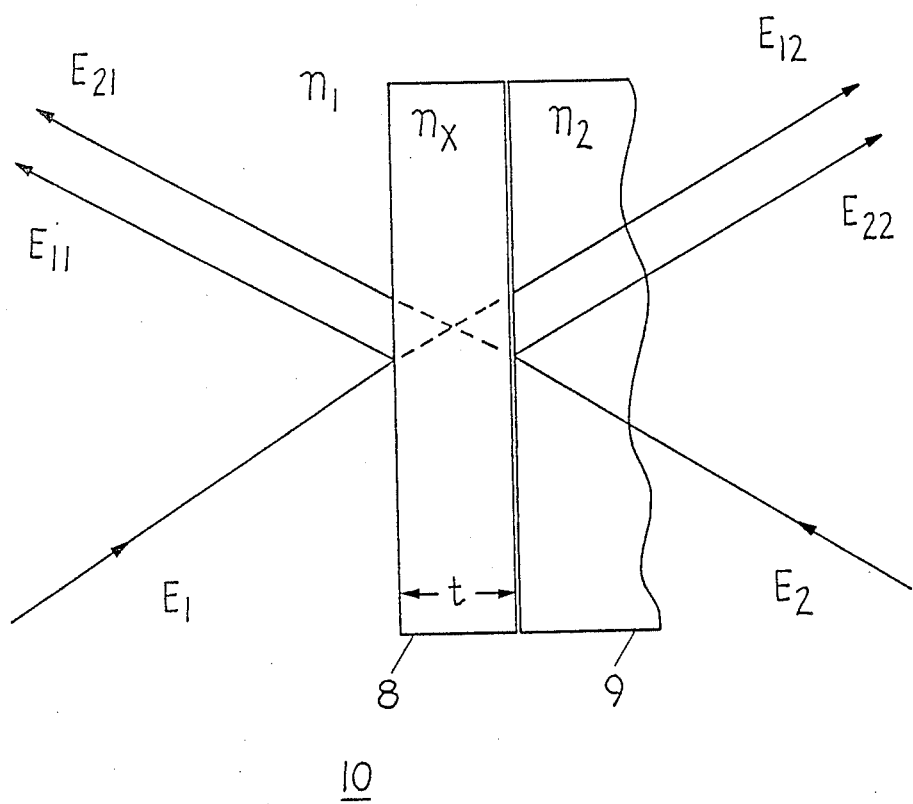
FIG. 1 is a diagrammatic representation of an optical film used as a beam-splitter combining input beams interferometrically in accordance with the prior art.
Figure 2:
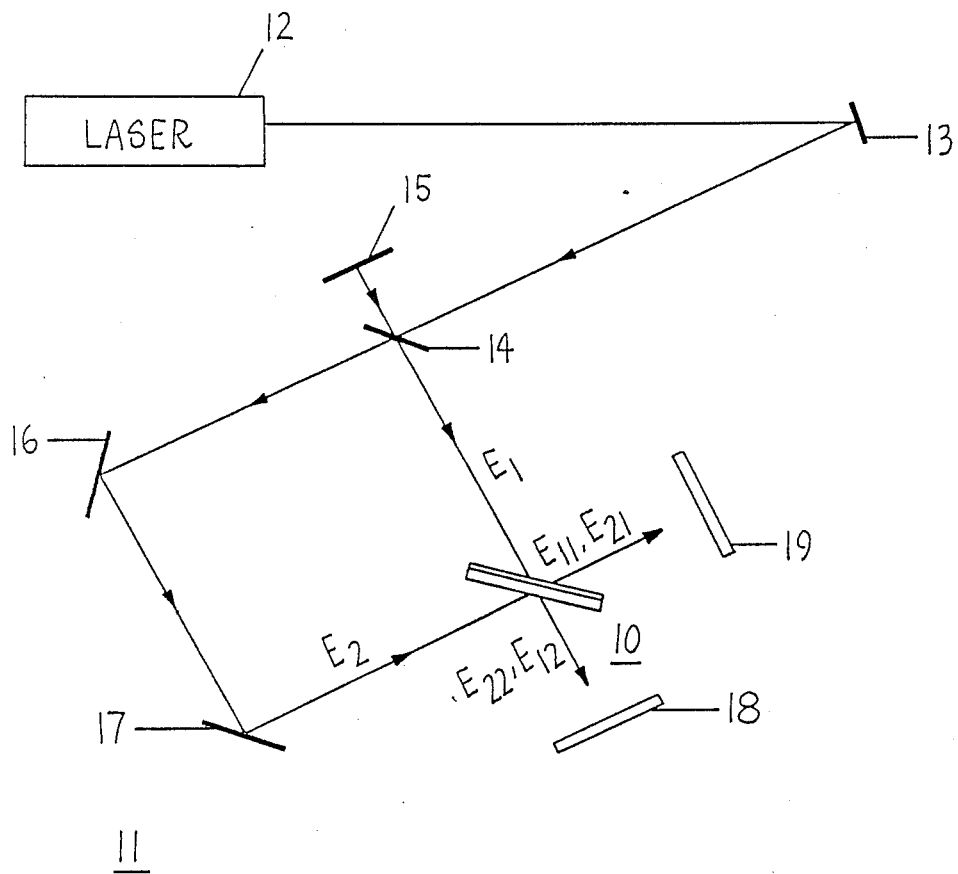
FIG. 2 is a diagrammatic representation of a thin film interferometer employing the thin film depicted in FIG. 1.

Before describing the Preferred Embodiment, it is helpful to review the use of a sample 10 consisting of an optical film 8 of thickness t deposited on a transparent substrate 9 such as plastic, glass or crystal, for example, as shown in FIG. 1. The sample being employed as a beam-splitter within a modified mach-zender interferometer 11 (FIG. 2). The index of refraction $n_1$, is that of air and the index of refraction $n_2$ is that of the substrate 9. The thickness t of the optical film is small with respect to that of the substrate and is determined by interferometric techniques as described within the aforementioned paper to J. Shamir and P. Graff. $E_1$ is a beam of light incident on one side of the sample which results in a transmitted component $E_{12}$ and a reflected component $E_{11}$. $E_2$ is a beam of light coherent with beam E, incident on the opposite side which results in a transmitted component $E_{21}$ and a reflected component $E_{22}$ as indicated.

In the simplified interferometer 11 depicted in FIG. 2, a laser 12 is used to provide the initial beam of incident light which is reflected off a first mirror 13 onto the first beam-splitter 14. The reflected component of the beam is directed to and reflected from translatable mirror 15. This reflection is transmitted through beam-splitter 14 towards the sample 10 and constitutes the incident beam $E_1$ described earlier. The component of the original beam reflected from mirror 13 and transmitted through beam-splitter 14 is reflected off a pair of mirrors 16, 17 onto the opposite side of sample 10 and constitutes the incident beam $E_2$ described earlier. The transmitted beams $E_{12}$, $E_{21}$, must be precisely superimposed on the reflected beams $E_{22}$, $E_{11}$ respectively and thereafter received upon light detecting devices 18, 19 wherein their intensities are determined as a function of the position of the translatable mirror 15. It is within this arrangement that the mirrors 15, 16, 17 and beam-splitters 14, 10 must be precisely aligned such that the transmitted and reflected light beams become exactly superimposed.

Figure 3:
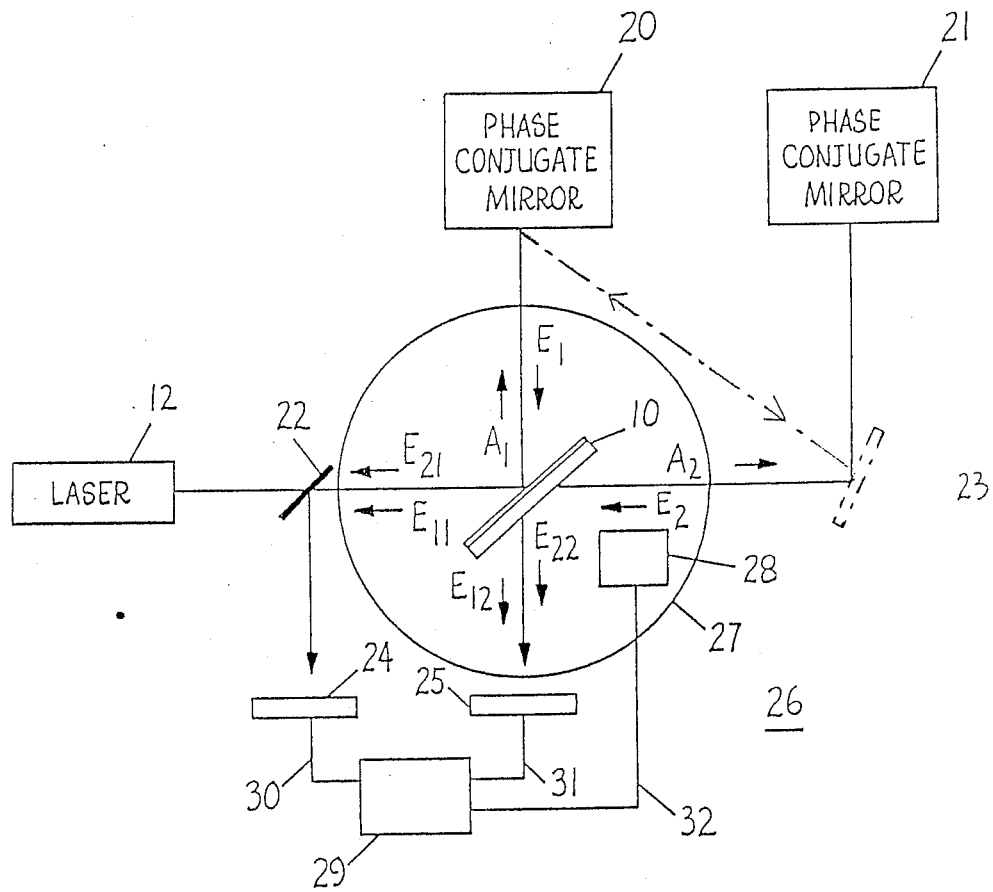
FIG. 3 is a diagrammatic representation of one embodiment of the phase conjugate interferometer in accordance with the invention.

In the phase conjugate interferometer 26 depicted in FIG. 3, a similar laser 12 provides an incident beam of coherent light directly to a first beam-splitter 22. A portion $A_1$ of the transmitted component reflected from the sample 10, is reflected back on itself from the phase conjugate mirror 20 and returns to the sample 10 thereby constituting the incident beam $E_1$ to the sample 10. A second portion $A_2$ of the transmitted component transmitted through the sample 10, and reflected from a translatable mirror 23, is reflected back on itself from the phase conjugate mirror 21, and is reflected again from the translatable mirror 23 returning to the sample 10 thereby constituting the incident beam $E_2$ to the sample 10. As in FIG. 2, incident beam $E_1$ produces beams $E_{11}$ and $E_{21}$ while incident beam $E_2$ produces beams $E_{22}$ and $E_{21}$. The intensity of the sum of beams $E_{22}$ and $E_{12}$ is measured by detector 25 and the intensity of the sum of beams $E_{11}$ and $E_{21}$ is measured by detector 24. The phase of beam $E_2$ relative to beam $E_1$ must be varied during the measurement process. In the embodiment shown in FIG. 3 this phase variation is accomplished by moving the translatable mirror 23 which could, for example be a piezomirror. A piezomirror, for purposes of this disclosure, consists of a reflective mirror mounted on a crystal having a thickness dependent upon an applied voltage to translate the mirror in a controllable fashion. Other embodiments may use alternative phase shifters such as electro-optic modulators in place of translatable mirror 23 for beam $E_2$. The optical properties are calculated on the basis of measurements from detectors 24, 25 by a computer contained within the controller 29. For some applications, the second phase conjugate mirror 21 can be eliminated and the angle of the piezomirror 23 is adjusted to reflect the modulated beam A₂ directly to phase conjugate mirror 20 as indicated in phantom.

The phase conjugate interferometer of the invention can be used as a real time monitor in a thin film deposition process whereby the optical properties of the thin film can be measured during deposition for exact control over the thickness, refractive index and absorption properties of the deposited film. It is anticipated that a feedback control system could be employed within thin film deposition apparatus that could employ thermal evaporation as well as ion-deposition such as described within U.S. patent application Ser. No. 405,271 filed Sept. 11, 1989 entitled "Ion-Beam Based Deposition of Coatings for Electrochromic Devices", which Application is incorporated herein for purposes of reference. The temperature of the evaporation source and the ion voltages can be automatically controlled to produce the best electrochromic devices heretofore attainable. In this arrangement, the sample 10 is enclosed within a transparent deposition chamber 27 which includes an ion beam and thermal deposition source 28. A controller 29 is connected with the detectors 24, 25 over conductors 30, 31 and is connected with the deposition source 28 by means of the feedback conductor 32.

Having thus described our invention, what we claim as new and desire to seek by Letters Patent is:

1. An optical interferometer comprising:
   a source of coherent light;
   a first beam-splitter arranged for receiving said coherent light and generating a first transmitted beam and a first reflected beam;
   a second beam-splitter arranged for receiving said first transmitted beam and generating a second reflected beam and a second transmitted beam, said second beam-splitter including a film of undetermined optical parameters;
   a first phase conjugate mirror arranged for receiving said second reflected beam from said optical film and reflecting said second reflected beam back to said second beam-splitter, said second beam-splitter generating a third transmitted beam and a third reflected beam;
   an optical modulator arranged for receiving said second transmitted beam and applying phase or amplitude modulation to said second transmitted beam, said first phase conjugate mirror arranged for receiving said modulated second transmitted beam and reflecting said modulated second transmitted beam back to said optical modulator, said optical modulator generating a further modulated second transmitted beam and transmitting said further modulated second transmitted beam back to said second beam-splitter, said second beam-splitter generating a fourth reflected beam and a fourth transmitted beam;
   a first light detector for receiving said third transmitted beam and said fourth reflected beam;
   a second light detector for receiving said third reflected beam and said fourth transmitted beam, said third reflected beam and fourth transmitted beam being reflected from said first beam-splitter; and
   an instrument for receiving the output of said first and second detectors thereby determining said optical parameters.

2. The interferometer of claim 1 including a second phase conjugate mirror arranged for receiving said optical modulated second transmitted beam and reflecting said modulated second transmitted beam back to said modulator, said optical modulator generating said further modulated second transmitted beam and transmitting said further modulated second transmitted beam back to said second beam-splitter, said second beam-splitter generating said fourth reflected beam and said fourth transmitted beam.

3. The interferometer of claim 1 wherein said film comprises an optical film.

4. The interferometer of claim 10 wherein said phase modulator is a piezo mirror.

5. The interferometer of claim 3 wherein said optical film comprises one or more layers of a multi-layer electrochromic device.

6. A method of determining optical film parameters comprising the steps of:
   providing a source of coherent light;
   arranging a first beam-splitter to receive said coherent light and generate a first transmitted beam and a first reflected beam;
   arranging a second beam-splitter to receive said first transmitted beam and generate a second reflected beam and a second transmitted beam, said second beam-splitter including an optical film of undetermined optical parameters;
   providing a first phase conjugate mirror to receive said second reflected beam from said optical film and reflect said second reflected beam back to said second beam-splitter, said second beam-splitter thereby generating a third transmitted beam and a third reflected beam;
   arranging an optical modulator to receive said second transmitted beam and apply phase or amplitude modulation to said second transmitted beam;
   positioning said first phase conjugate mirror to receive said modulated second transmitted beam and reflect said modulated second transmitted beam back to said phase or amplitude modulator, said optical modulator generating a further modulated second transmitted beam and transmit said further modulated second transmitted beam back to said second beam-splitter, said second beam-splitter generating a fourth reflected beam and a fourth transmitted beam;
   positioning a first light detector to receive said third transmitted beam and said fourth reflected beam;
   positioning a second light detector to receive said third reflected beam and said fourth transmitted beam; and
   providing an instrument to receive an output from said first and second detectors to thereby determine said optical parameters.

7. The method of claim 6 including the step of arranging a second phase conjugate mirror to receive said modulated second transmitted beam and reflecting said modulated transmitted beam back to said optical modulator, said optical modulator thereby generating a further modulated second transmitted beam and transmitting said further modulated second transmitted beam back to said second beam-splitter, said second beam-splitter generating said fourth reflected beam and said fourth transmitted beam.

8. A method of producing optical devices comprising the steps of:

providing a deposition chamber containing optical film deposition means therein;

arranging a first and second beam-splitter proximate said disposition chamber, one of said first and second beam-splitters including a substrate for optical film deposition;

providing a first phase conjugate mirror and an optical modulator and aligning said first and second beam-splitters to send beams of coherent light to said first phase conjugate mirror and said optical modulator, said first phase conjugate mirror thereby reflecting said beams back to said first and second beam-splitters;

arranging a first and second detector to receive said beams from said first phase conjugate mirror and said optical modulator;

determining optical parameters of said film deposition; and providing feedback control of said optical film deposition to said deposition chamber.

9. A method of producing optical devices comprising the steps of:

providing a source of coherent light;

providing a deposition chamber containing optical film deposition means therein to receive said coherent light;

arranging a pair of first and second beam-splitters proximate said deposition chamber, one of said beam-splitters including a substrate for optical film deposition;

providing first and second phase conjugate mirrors and an optical modulator and aligning said second beam-splitter and said optical modulator at a predetermined angle to said first and second phase conjugate mirrors for sending beams of said coherent light to each of said phase conjugate mirrors and said optical modulator, said phase conjugate mirrors reflecting said beams back to said beam-splitters at said predetermined angle;

providing a pair of detectors for receiving reflected optical beams returned from said phase conjugate mirrors and optical modulator via said beam-splitters; and determining optical parameters of said optical film during deposition and providing feedback control of said optical film deposition.

10. The interferometer of claim 1 wherein said optical modulator comprises a phase modulator.

11. The interferometer of claim 1 wherein said optical modulator comprises an amplitude modulator.

* * * * *